United States Patent
Lu et al.

(10) Patent No.: US 12,349,249 B2
(45) Date of Patent: Jul. 1, 2025

(54) HIGH COMPATIBILITY DIMMING SYSTEM

(71) Applicant: Xiamen PVTECH Co., Ltd., Fujian (CN)

(72) Inventors: Fuxing Lu, Fujian (CN); Rongtu Liu, Fujian (CN); Wangan Luo, Fujian (CN)

(73) Assignee: Xiamen PVTECH Co., Ltd., Fujian (CN)

(*) Notice: Subject to any disclaimer, the term of this patent is extended or adjusted under 35 U.S.C. 154(b) by 209 days.

(21) Appl. No.: 18/198,296

(22) Filed: May 17, 2023

(65) Prior Publication Data

US 2024/0215127 A1 Jun. 27, 2024

(30) Foreign Application Priority Data

Dec. 22, 2022 (CN) .......................... 202211657237.8

(51) Int. Cl.
*H05B 45/14* (2020.01)
*H05B 45/325* (2020.01)
*H05B 45/345* (2020.01)
*H05B 45/36* (2020.01)

(52) U.S. Cl.
CPC ........... *H05B 45/14* (2020.01); *H05B 45/325* (2020.01); *H05B 45/345* (2020.01); *H05B 45/36* (2020.01)

(58) Field of Classification Search
CPC .... H05B 45/14; H05B 45/325; H05B 45/345; H05B 45/36; H05B 45/10; Y02B 20/40
See application file for complete search history.

(56) References Cited

U.S. PATENT DOCUMENTS 7,575,467 B2 * 8/2009 Ferguson ............... H01R 13/44
439/489

FOREIGN PATENT DOCUMENTS

CN 202603016 12/2012
TW M373607 U * 2/2010

* cited by examiner

Primary Examiner — Metasebia T Retebo
(74) Attorney, Agent, or Firm — Winston Hsu

(57) ABSTRACT

A dimming system includes an AC source connector, a lighting device and a wall switch. The lighting device includes a rectifying circuit, a constant current circuit, a control circuit and a light source. The input end of the rectifying circuit is connected to the output end of the AC source connector. The output end of the rectifying circuit is connected to the constant current circuit. The control circuit is connected to the rectifying circuit and the constant current circuit. The constant current circuit is connected to the light source. The wall switch includes a measuring circuit. An external power source is connected to the input end of the AC source connector via the wall switch. The control circuit keeps detecting the measured value of the measuring circuit and generates a dimming signal according to the number of the times of detecting the measured value during a predetermined time period.

9 Claims, 6 Drawing Sheets

HIGH COMPATIBILITY DIMMING SYSTEM

BACKGROUND OF THE INVENTION

1. Field of the Invention

The present invention relates to a dimming system, in particular to a high compatibility dimming system.

2. Description of the Prior Art

Currently, the demand for lighting devices with dimming function is gradually increasing. Thus, lighting devices with dimming function have higher market acceptance and added value. Currently, there are three main types of dimming methods. The first is the traditional silicon-controlled phase-cut dimming, the second is power line carrier dimming (such as DALI), and the third is wireless dimming (such as Bluetooth, WIFI, etc.).

The above-mentioned currently available dimming technologies are only applicable to lighting devices with corresponding functions and require corresponding dimmers or intelligent control platform software, which limits the compatibility thereof. Accordingly, the costs of currently available dimming technologies are also increased.

SUMMARY OF THE INVENTION

One embodiment of the present invention provides a high compatibility dimming system, which includes an alternating current source connector, a lighting device and a wall switch. The lighting device includes a rectifying circuit, a constant current circuit, a control circuit and a light source. The input end of the rectifying circuit is connected to the output end of the alternating current source connector. The output end of the rectifying circuit is connected to the constant current circuit. The control circuit is connected to the rectifying circuit and the constant current circuit. The constant current circuit is connected to the light source. The wall switch includes a measuring circuit. The external power source is connected to the input end of the alternating current source connector via the wall switch. The control circuit continuously detects a measured value of the measuring circuit and generates a dimming signal according to the number of the times of detecting the measured value during a predetermined time period in order to control the constant current circuit to adjust a brightness of the light source.

In one embodiment, the wall switch further includes a first switch and a second switch. The first end of the first switch is connected to the live wire terminal of the external power source. The second end of the first switch is connected to the live wire terminal of the alternating current source connector and the first end of the measuring circuit. The first end of the second switch is connected to the neutral wire terminal of the external power source and the neutral wire terminal of the alternating current source connector. The second end of the second switch is connected to the second end of the measuring circuit.

In one embodiment, the wall switch further includes a first switch, a second switch and a full wave rectifier. The first end of the first switch is connected to the first end of the full wave rectifier. The second end of the first switch is connected to the live wire terminal of the alternating current source connector and the first end of the measuring circuit. The first end of the second switch is connected to the second end of the full wave rectifier. The second end of the second switch is connected to the second end of the measuring circuit. The third end and the fourth end of the full wave rectifier are connected to the live wire terminal and the neutral wire terminal of the external power source respectively.

In one embodiment, the measuring circuit includes one or more of a capacitor, a resistor and an inductor. The measuring circuit is a series circuit, a parallel circuit or a combination thereof.

In one embodiment, the control circuit couples a detecting signal to the alternating current source connector in order to detect the measured value of the measuring circuit.

In one embodiment, the lighting device further includes a filtering circuit. The rectifying circuit is connected to the constant current circuit via the filtering circuit.

In one embodiment, the lighting device further includes an assistant power source. The control circuit is connected to the rectifying circuit via the assistant power source.

In one embodiment, the lighting device further includes an assistant power source and a leakage detecting circuit. The control circuit is connected to the assistant power source. The assistant power source is connected to the leakage detecting circuit. The leakage detecting circuit is connected to the rectifying circuit.

In one embodiment, the light source is a light-emitting diode (LED).

In one embodiment, the dimming signal is a pulse width modulation (PWM) signal.

The high compatibility dimming system in accordance with the embodiments of the present invention may have the following advantages:

(1) In one embodiment of the present invention, the lighting device of the dimming system has a control circuit, which can provide the alternating current detecting and control function. Besides, the wall switch of the dimming system has a measuring circuit, such that the control circuit of the lighting device can couple the detecting signal to the alternating current source connector of the dimming system in order to detect the measured value of the measuring circuit and generate a dimming signal according to the number of the times of detecting the measured value during a predetermined time period in order to perform the dimming function. The above mechanism can be applied to most lighting devices, such that the dimming system can be of high compatibility.

(2) In one embodiment of the present invention, the wall switch of the dimming system has a measuring circuit, a first switch, a second switch and a full wave rectifier. The full wave rectifier can effectively isolate the detecting signal of the control circuit of the lighting device from the equivalent impedance of the external circuits. Thus, the detecting sensitivity of the control device of the lighting device can be significantly enhanced. Therefore, the dimming function of the dimming system can be optimized.

(3) In one embodiment of the present invention, the dimming system can realize the dimming function via the wall switch and a special dimming mechanism without a dimmer or dimming software. Accordingly, the cost of the dimming system can be greatly reduced. Therefore, the dimming system can be more comprehensive in application and flexible in use.

(4) In one embodiment of the present invention, the lighting device of the dimming system further includes an assistant power source, and the control circuit of the lighting device can be connected to the rectifying circuit of the lighting device via the assistant power source. Thus, the lighting device can be further provided with a microwave module, an infrared sensing module or other functional modules. As a result, the lighting device can provide more functions with a view to satisfy actual requirements.

(5) In one embodiment of the present invention, the lighting device of the dimming system further includes an assistant power source and a leakage detecting circuit. The control circuit of the lighting device can be connected to the assistant power source. The assistant power source is connected to the leakage detecting circuit and the leakage detecting circuit is connected to the rectifying circuit of the lighting device. The leakage detecting circuit of the lighting device can provide the leakage detecting function in order to prevent from electricity leakage. Thus, the safety of the lighting device can be greatly enhanced.

(6) In one embodiment of the present invention, the lighting device of the dimming system can be further integrated with the microwave module, infrared sensing module or other functional modules so as to provide various intelligent functions. Accordingly, the lighting device can be in line with future development trends.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
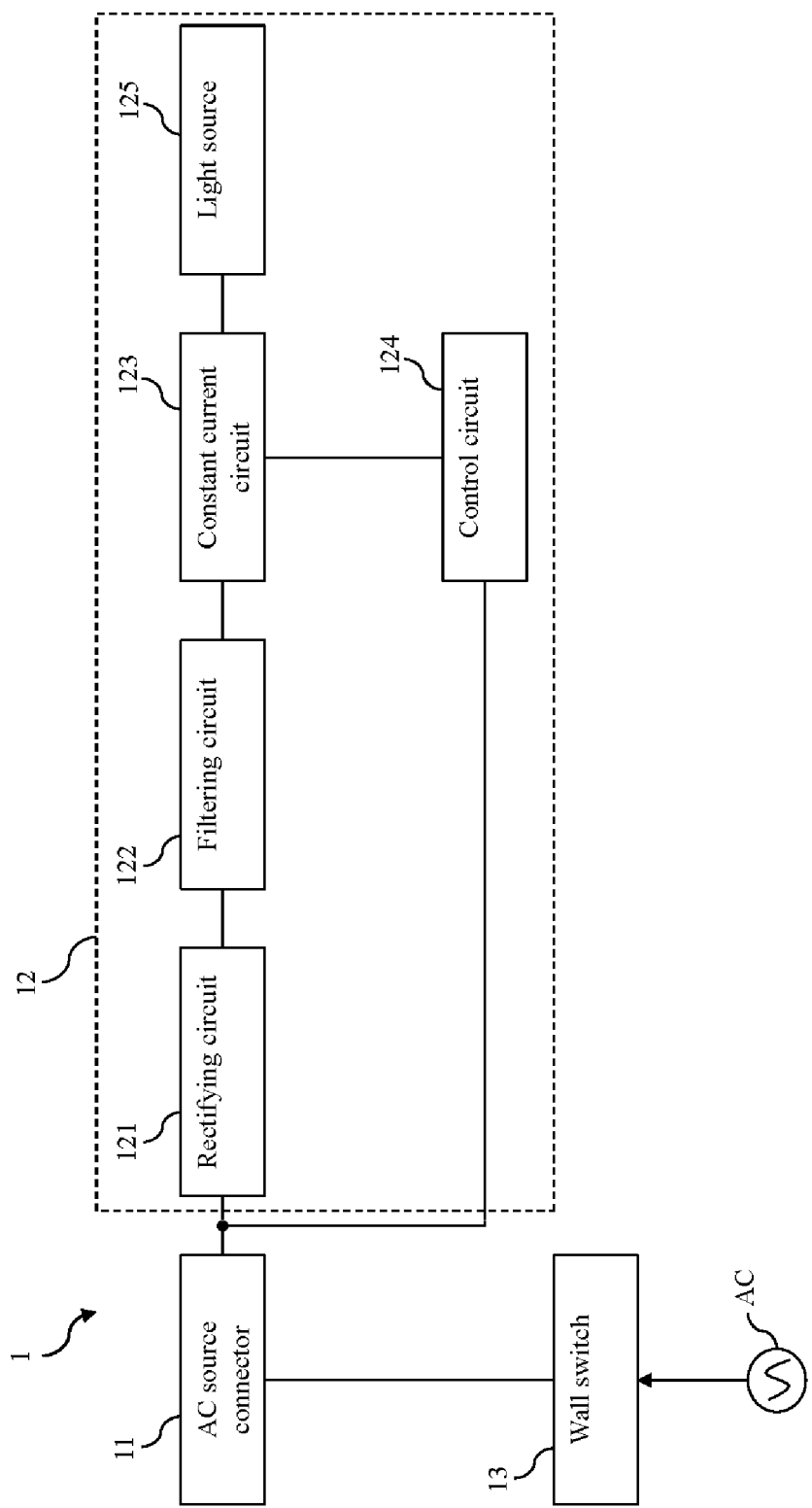
FIG. 1 is a block diagram of a high compatibility dimming system in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
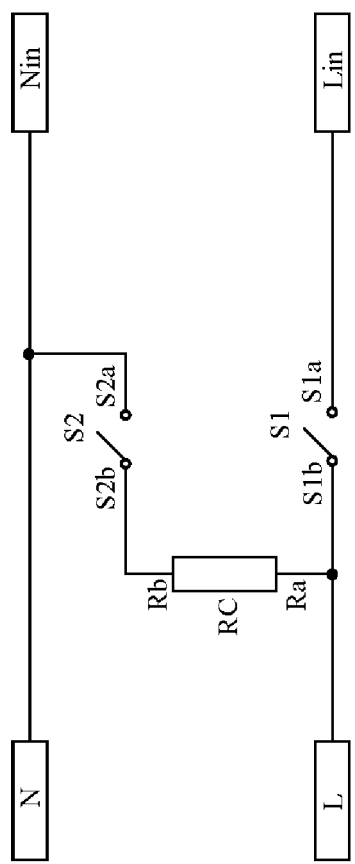
FIG. 2 is a circuit diagram of the high compatibility dimming system in accordance with one embodiment of the present invention.
Figure 3:
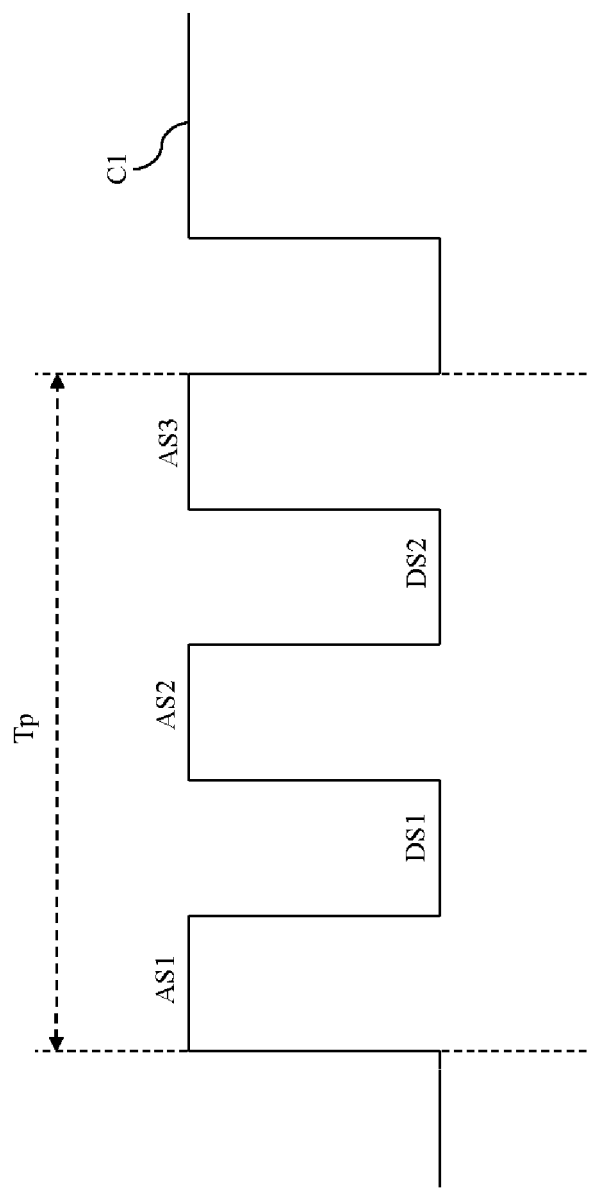
FIG. 3 is a schematic view of an operational state of the high compatibility dimming system in accordance with one embodiment of the present invention.

Please refer to FIG. 1, FIG. 2 and FIG. 3. FIG. 1 is a block diagram of a high compatibility dimming system in accordance with one embodiment of the present invention. FIG. 2 is a circuit diagram of the high compatibility dimming system in accordance with one embodiment of the present invention. FIG. 3 is a schematic view of an operational state of the high compatibility dimming system in accordance with one embodiment of the present invention. As shown in FIG. 1, the dimming system 1 includes an alternating current (AC) source connector 11, a lighting device 12 and a wall switch 13. An external power source AC is connected to the input end of the AC source connector 11 via the wall switch 13. In one embodiment, the external power source AC may be utility power or other currently available AC power sources.

The lighting device 12 is connected to the AC source connector 11. In one embodiment, the AC source connector 11 may be a lamp holder or other similar components. In another embodiment, the AC source connector 11 may be the metal pins of the lighting device 12, which is a part of the lighting device 12.

The lighting device 12 includes a rectifying circuit 121, a filtering circuit 122, a constant current circuit 123, a control circuit 124 and a light source 125. The input end of the rectifying circuit 121 is connected to the output end of the AC source connector 11. The output end of the rectifying circuit 121 is connected to the filtering circuit 122. The filtering circuit 122 is connected to the constant current circuit 123. The control circuit 124 is connected to the rectifying circuit 121 and the constant current circuit 123. The constant current circuit 123 is connected to the light source 125. In one embodiment, the rectifying circuit 121 may be a full wave rectifier, a half wave rectifier or other similar components. In one embodiment, the filtering circuit 122 may be a noise filter, an EMI filter or other similar filters for LEDs. In one embodiment, the constant current circuit 123 may be a constant current source circuit having an operational amplifier, a constant current source circuit having a stabilizer, a constant current source circuit having a transistor or other similar components. In one embodiment, the light source 125 may be a LED. In another embodiment, the light source 125 may be a bulb or other currently available light sources. The alternating current inputted by the external power source AC can drive the light source 125 via the AC source connector 11, the rectifying circuit 121, the filtering circuit 122 and the constant current circuit 123.

As shown in FIG. 2, the wall switch 13 includes a measuring circuit RC, a first switch S1 and a second switch S2. The first end S1a of the first switch S1 is connected to the live wire terminal Lin of the external power source AC. The second end S1b of the first switch S1 is connected to the live wire terminal L of the AC source connector 11 and the first end Ra of the measuring circuit RC. The first end S2a of the second switch S2 is connected to the neutral wire terminal Nin of the external power source AC and the neutral wire terminal N of the AC source connector 11. The second end S2b of the second switch S2 is connected to the second end Rb of the measuring circuit RC. In one embodiment the measuring circuit RC may be a circuit including at least one capacitor and at least one resistor, and the capacitor and the resistor are connected to each other in parallel or in series. In another embodiment, the measuring circuit RC may include one of a capacitor, a resistor, an inductor and other currently available electronic components. In still another embodiment, the measuring circuit RC may include two or more of the above electronic components. The circuit formed by above electronic components may be a parallel circuit, a series circuit or the combination thereof. The measuring circuit RC can effectively measure the circuit state value between the two ends of the AC source connector 11. In this way, the control circuit 124 can couple the detecting signal to the AC source connector 11 in order to measure the measured value of the measuring circuit RC so as to obtain the circuit state value between the two ends of the AC source connector 11. In the embodiment, the circuit state value may be the impedance between the two ends of the AC source connector 11. In another embodiment, the circuit state value may be one of impedance, capacitance, inductance, voltage and current; the circuit state value may also be the combination of two or more of impedance, capacitance, inductance, voltage and current.

The embodiment just exemplifies the present invention and is not intended to limit the scope of the present invention; any equivalent modification and variation according to the spirit of the present invention is to be also included within the scope of the following claims and their equivalents.

As shown in FIG. 3, the control circuit 124 can couple the detecting signal to the AC source connector 11 in order to detect the measured value of the measuring circuit RC. In this way, the control circuit 124 can continuously detect the measured value of the measuring circuit RC with a view to generating a dimming signal according to the number of the times of detecting the measured value during a predetermined time period Tp so as to control the constant current circuit 123 to adjust the brightness of the light source 125. In one embodiment, the dimming signal is a pulse width modulation (PWM) signal or other similar dimming signals.

When the first switch S1 and the second switch S2 of the wall switch 13 are turned on (as the line segment AS1 of the square wave C1 shown in FIG. 3), the control circuit 124 can detect the measured value of the measuring circuit RC. When the first switch S1 and the second switch S2 of the wall switch 13 are turned off (as the line segment DS1 of the square wave C1 shown in FIG. 3), the control circuit 124 cannot detect the measured value of the measuring circuit RC. Next, the control circuit 124 can record that the number of the times of detecting the measured value is 1. Similarly, when the first switch S1 and the second switch S2 of the wall switch 13 are turned on again (as the line segment AS2 of the square wave C1 shown in FIG. 3), the control circuit 124 can detect the measured value of the measuring circuit RC. When the first switch S1 and the second switch S2 of the wall switch 13 are turned off again (as the line segment DS2 of the square wave C1 shown in FIG. 3), the control circuit 124 cannot detect the measured value of the measuring circuit RC. Then, the control circuit 124 can record that the number of the times of detecting the measured value is 2. When the first switch S1 and the second switch S2 of the wall switch 13 are turned on again (as the line segment AS3 of the square wave C1 shown in FIG. 3), the control circuit 124 can detect the measured value of the measuring circuit RC. When the control circuit 124 determines that the number of the times of detecting the measured value reach a predetermined threshold (the predetermined threshold in this embodiment is 2) during the predetermined time period Tp, the control circuit 124 can adjust the brightness of the light source 125 according to the number of the times of detecting the measured value. The aforementioned predetermined time period Tp and the predetermined threshold can be adjusted according to actual requirements. There may be several predetermined time periods Tp and the predetermined thresholds corresponding thereto, which can be corresponding to different brightness values.

As set forth above, the lighting device 12 of the dimming system 1 has the control circuit 124, which can provide the AC detecting and control function. Besides, the wall switch 13 of the dimming system 1 has the measuring circuit RC. Therefore, the control circuit 124 of the lighting device 12 can couple the detecting signal to the AC source connector 11 of the dimming system 1 in order to detect the measured value of the measuring circuit RC. Afterward, the control circuit 124 of the lighting device 12 can generate the dimming signal according to the number of the times of detecting the measured value during the predetermined time period Tp in order to perform the dimming function. The above mechanism can be applied to most lighting devices, such that the dimming system 1 can be of high compatibility with a view to meeting actual requirements.

The embodiment just exemplifies the present invention and is not intended to limit the scope of the present invention; any equivalent modification and variation according to the spirit of the present invention is to be also included within the scope of the following claims and their equivalents.

Figure 4:
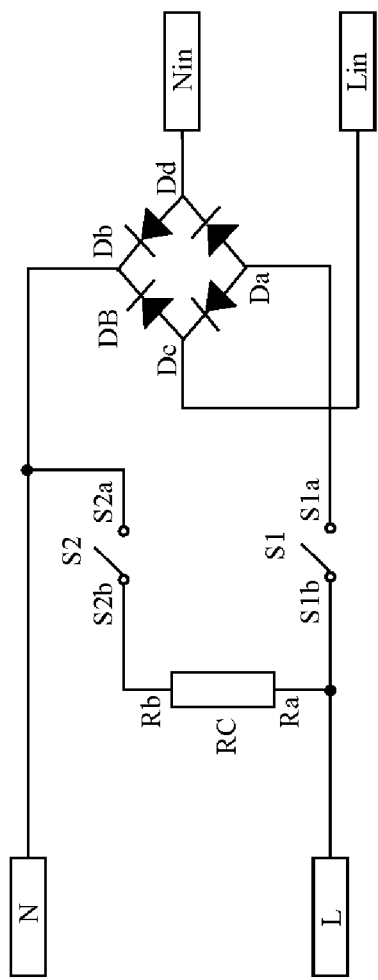
FIG. 4 is a circuit diagram of a wall switch of a high compatibility dimming system in accordance with another embodiment of the present invention.

Please refer to FIG. 4, which is a circuit diagram of a wall switch of a high compatibility dimming system in accordance with another embodiment of the present invention. As shown in FIG. 4, the wall switch 13 includes a measuring circuit RC, a first switch S1, a second switch S2 and a full wave rectifier DB. The first end S1a of the first switch S1 is connected to the first end Da of the full wave rectifier DB. The second end S1b of the first switch Q1 is connected to the live wire terminal L of the AC source connector 11 and the first end Ra of the measuring circuit RC. The first end S2a of the second switch S2 is connected to the second end Db of the full wave rectifier DB. The second end S2b of the second switch S2 is connected to the second end Rb of the measuring circuit RC. The third end Dc and the fourth end Dd of the full wave rectifier DB are connected to the live wire terminal Lin and the neutral wire terminal Nin of the external power source AC respectively.

The operational mechanism of the wall switch 13 is the same with that of the wall switch 13 of the previous embodiment. As shown in FIG. 3, when the first switch S1 and the second switch S2 of the wall switch 13 are turned on (as the line segment AS1 of the square wave C1 shown in FIG. 3), the control circuit 124 can detect the measured value of the measuring circuit RC. When the first switch S1 and the second switch S2 of the wall switch 13 are turned off (as the line segment DS1 of the square wave C1 shown in FIG. 3), the control circuit 124 cannot detect the measured value of the measuring circuit RC. Next, the control circuit 124 can record that the number of the times of detecting the measured value is 1. Similarly, when the first switch S1 and the second switch S2 of the wall switch 13 are turned on again (as the line segment AS2 of the square wave C1 shown in FIG. 3), the control circuit 124 can detect the measured value of the measuring circuit RC. When the first switch S1 and the second switch S2 of the wall switch 13 are turned off again (as the line segment DS2 of the square wave C1 shown in FIG. 3), the control circuit 124 cannot detect the measured value of the measuring circuit RC. Then, the control circuit 124 can record that the number of the times of detecting the measured value is 2. When the first switch S1 and the second switch S2 of the wall switch 13 are turned on again (as the line segment AS3 of the square wave C1 shown in FIG. 3), the control circuit 124 can detect the measured value of the measuring circuit RC. When the control circuit 124 determines that the number of the times of detecting the measured value reach the predetermined threshold (the predetermined threshold in this embodiment is 2) during the predetermined time period Tp, the control circuit 124 can adjust the brightness of the light source 125 according to the number of the times of detecting the measured value. The aforementioned predetermined time period Tp and the predetermined threshold can be adjusted according to actual requirements. There may be several predetermined time periods Tp and the predetermined thresholds corresponding thereto, which can be corresponding to different brightness values.

The embodiment just exemplifies the present invention and is not intended to limit the scope of the present invention; any equivalent modification and variation according to the spirit of the present invention is to be also included within the scope of the following claims and their equivalents.

It is worthy to point out that the currently available dimming technologies are only applicable to lighting devices with corresponding functions and require corresponding dimmers or intelligent control platform software, which limits the compatibility thereof. Accordingly, the costs of currently available dimming technologies are also increased. On the contrary, according to one embodiment of the present invention, the lighting device of the dimming system has a control circuit, which can provide the alternating current detecting and control function. Besides, the wall switch of the dimming system has a measuring circuit, such that the control circuit of the lighting device can couple the detecting signal to the alternating current source connector of the dimming system in order to detect the measured value of the measuring circuit and generate a dimming signal according to the number of the times of detecting the measured value during a predetermined time period in order to perform the dimming function. The above mechanism can be applied to most lighting devices, such that the dimming system can be of high compatibility.

In addition, according to one embodiment of the present invention, the wall switch of the dimming system has a measuring circuit, a first switch, a second switch and a full wave rectifier. The full wave rectifier can effectively isolate the detecting signal of the control circuit of the lighting device from the equivalent impedance of the external circuits. Thus, the detecting sensitivity of the control device of the lighting device can be significantly enhanced. Therefore, the dimming function of the dimming system can be optimized.

Moreover, according to one embodiment of the present invention, the dimming system can realize the dimming function via the wall switch and a special dimming mechanism without a dimmer or dimming software. Accordingly, the cost of the dimming system can be greatly reduced. Therefore, the dimming system can be more comprehensive in application and flexible in use. As described above, the high compatibility dimming system according to the embodiments of the present invention can definitely achieve great technical effects.

Figure 5:
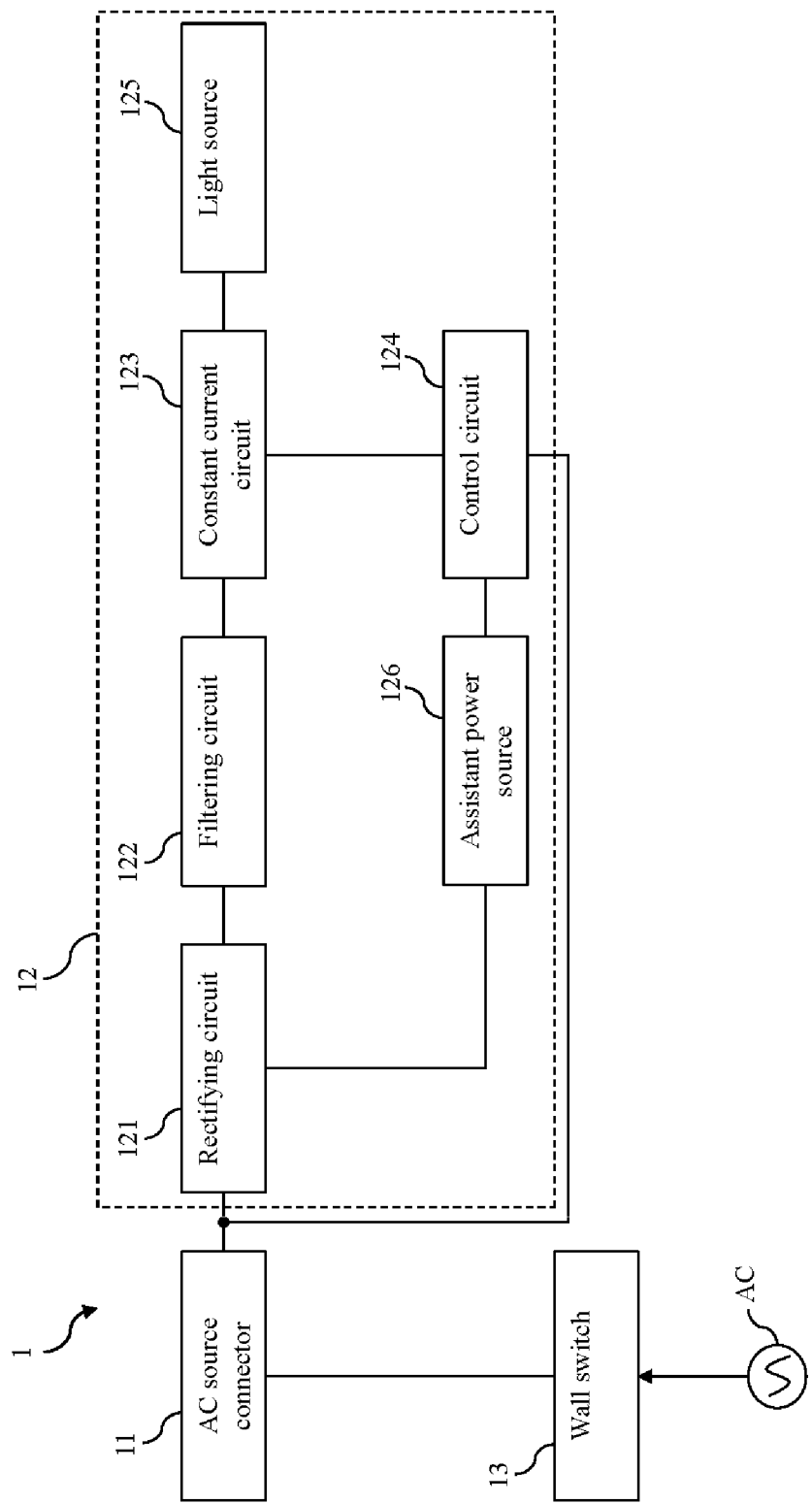
FIG. 5 is a block diagram of the high compatibility dimming system in accordance with another embodiment of the present invention.

Please refer to FIG. 5, which is a block diagram of the high compatibility dimming system in accordance with another embodiment of the present invention. As shown in FIG. 5, the dimming system 1 includes an AC source connector 11, a lighting device 12 and a wall switch 13. An external power source AC is connected to the input end of the AC source connector 11 via the wall switch 13. The lighting device 12 is connected to the AC source connector 11.

The lighting device 12 includes a rectifying circuit 121, a filtering circuit 122, a constant current circuit 123, a control circuit 124 and a light source 125. The input end of the rectifying circuit 121 is connected to the output end of the AC source connector 11. The output end of the rectifying circuit 121 is connected to the filtering circuit 122. The filtering circuit 122 is connected to the constant current circuit 123. The control circuit 124 is connected to the rectifying circuit 121 and the constant current circuit 123. The constant current circuit 123 is connected to the light source 125. The alternating current inputted by the external power source AC can drive the light source 125 via the AC source connector 11, the rectifying circuit 121, the filtering circuit 122 and the constant current circuit 123.

The above elements are similar to those of the previous embodiment, so will not be described herein again. The difference between this embodiment and the previous embodiment is that the lighting device 12 of this embodiment can further include an assistant power source 126. The control circuit 124 is connected to the rectifying circuit 121 via the assistant power source 126. In this way, the lighting device 12 can be further installed with various functional modules, such as a microwave module, an infrared sensing module, etc.

As previously stated, the lighting device 12 of the dimming system 1 of this embodiment can further include the assistant power source 126, and the control circuit 124 of the lighting device 12 can be connected to the rectifying circuit 121 of the lighting device 12 via the assistant power source 126. Accordingly, the lighting device 12 can be further installed with various functional modules, such as a microwave module, an infrared sensing module or other functional modules so as to provide more functions. As a result, the lighting device 12 can further satisfy actual requirements. In addition, the lighting device 12 of the dimming system 1 can be further integrated with the microwave module, infrared sensing module or other functional modules so as to provide various intelligent functions. Accordingly, the lighting device 12 can be in line with future development trends.

The embodiment just exemplifies the present invention and is not intended to limit the scope of the present invention; any equivalent modification and variation according to the spirit of the present invention is to be also included within the scope of the following claims and their equivalents.

Figure 6:
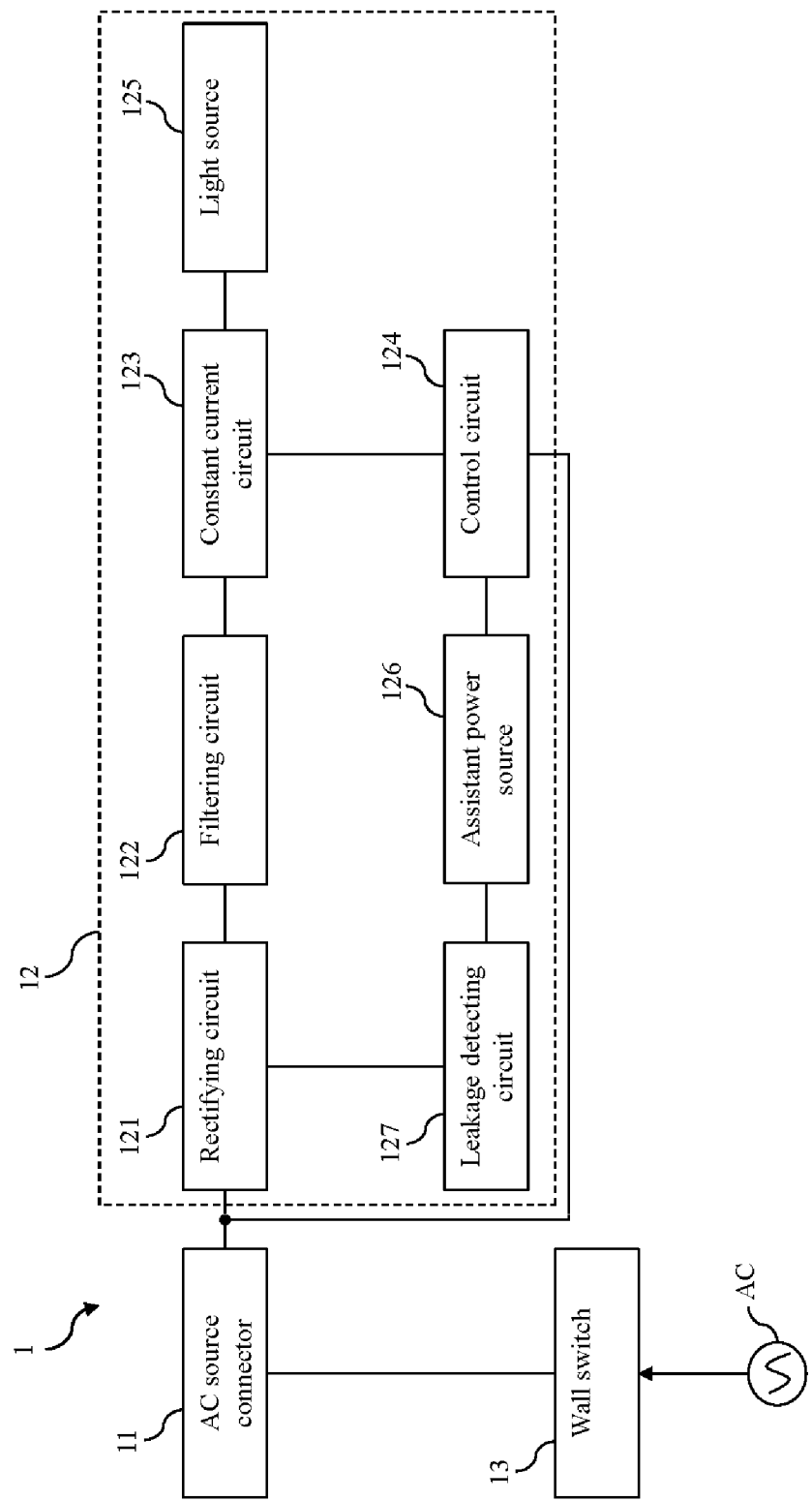
FIG. 6 is a block diagram of a high compatibility dimming system in accordance with still another embodiment of the present invention.

Please refer to FIG. 6, which is a block diagram of a high compatibility dimming system in accordance with still another embodiment of the present invention. As shown in FIG. 6, the dimming system 1 includes an AC source connector 11, a lighting device 12 and a wall switch 13. An external power source AC is connected to the input end of the AC source connector 11 via the wall switch 13. The lighting device 12 is connected to the AC source connector 11.

The lighting device 12 includes a rectifying circuit 121, a filtering circuit 122, a constant current circuit 123, a control circuit 124, a light source 125 and an assistant power source 126. The input end of the rectifying circuit 121 is connected to the output end of the AC source connector 11. The output end of the rectifying circuit 121 is connected to the filtering circuit 122. The filtering circuit 122 is connected to the constant current circuit 123. The control circuit 124 is connected to the rectifying circuit 121 and the constant current circuit 123. The constant current circuit 123 is connected to the light source 125. The control circuit 124 is connected to the rectifying circuit 121 via the assistant power source 126. The alternating current inputted by the external power source AC can drive the light source 125 via the AC source connector 11, the rectifying circuit 121, the filtering circuit 122 and the constant current circuit 123.

The above elements are similar to those of the previous embodiment, so will not be described herein again. The difference between this embodiment and the previous embodiment is that the lighting device 12 of this embodiment can further include a leakage detecting circuit 127. The control circuit 124 is connected to the assistant power source 126. The assistant power source 126 is connected to the leakage detecting circuit 127 and the leakage detecting circuit 127 is connected to the rectifying circuit 121. In this way, the lighting device 12 can be further installed with various functional modules, such as a microwave module, an infrared sensing module, etc.

As described above, the lighting device 12 of the dimming system 1 further includes a leakage detecting circuit 127, which can provide the leakage detecting function so as to prevent from electricity leakage. Thus, the safety of the lighting device 12 can be greatly enhanced.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting device of the dimming system has a control circuit, which can provide the alternating current detecting and control function. Besides, the wall switch of the dimming system has a measuring circuit, such that the control circuit of the lighting device can couple the detecting signal to the alternating current source connector of the dimming system in order to detect the measured value of the measuring circuit and generate a dimming signal according to the number of the times of detecting the measured value during a predetermined time period in order to perform the dimming function. The above mechanism can be applied to most lighting devices, such that the dimming system can be of high compatibility.

According to one embodiment of the present invention, the wall switch of the dimming system has a measuring circuit, a first switch, a second switch and a full wave rectifier. The full wave rectifier can effectively isolate the detecting signal of the control circuit of the lighting device from the equivalent impedance of the external circuits. Thus, the detecting sensitivity of the control device of the lighting device can be significantly enhanced. Therefore, the dimming function of the dimming system can be optimized.

Also, according to one embodiment of the present invention, the dimming system can realize the dimming function via the wall switch and a special dimming mechanism without a dimmer or dimming software. Accordingly, the cost of the dimming system can be greatly reduced. Therefore, the dimming system can be more comprehensive in application and flexible in use.

Further, according to one embodiment of the present invention, the lighting device of the dimming system further includes an assistant power source, and the control circuit of the lighting device can be connected to the rectifying circuit of the lighting device via the assistant power source. Thus, the lighting device can be further provided with a microwave module, an infrared sensing module or other functional modules. As a result, the lighting device can provide more functions with a view to satisfy actual requirements.

Moreover, according to one embodiment of the present invention, the lighting device of the dimming system further includes an assistant power source and a leakage detecting circuit. The control circuit of the lighting device can be connected to the assistant power source. The assistant power source is connected to the leakage detecting circuit and the leakage detecting circuit is connected to the rectifying circuit of the lighting device. The leakage detecting circuit of the lighting device can provide the leakage detecting function in order to prevent from electricity leakage. Thus, the safety of the lighting device can be greatly enhanced.

Furthermore, according to one embodiment of the present invention, the lighting device of the dimming system can be further integrated with the microwave module, infrared sensing module or other functional modules so as to provide various intelligent functions. Accordingly, the lighting device can be in line with future development trends.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A high compatibility dimming system, comprising:
an alternating current source connector;
a lighting device comprising a rectifying circuit, a constant current circuit, a control circuit and a light source, wherein an input end of the rectifying circuit is connected to an output end of the alternating current source connector, and an output end of the rectifying circuit is connected to the constant current circuit, and the control circuit is connected to the rectifying circuit and the constant current circuit, and the constant current circuit is connected to the light source; and
a wall switch comprising a measuring circuit, wherein an external power source is connected to an input end of the alternating current source connector via the wall switch;
wherein the control circuit is configured to continuously detect a measured value of the measuring circuit and generates a dimming signal according to a number of times of detecting the measured value during a predetermined time period in order to control the constant current circuit to adjust a brightness of the light source, wherein the wall switch further comprises a first switch and a second switch, wherein a first end of the first switch is connected to a live wire terminal of the external power source, a second end of the first switch is connected to a live wire terminal of the alternating current source connector and a first end of the measuring circuit, a first end of the second switch is connected to a neutral wire terminal of the external power source and a neutral wire terminal of the alternating current source connector, and a second end of the second switch is connected to a second end of the measuring circuit.

2. The high compatibility dimming system as claimed in claim 1, wherein the measuring circuit comprises one or more of a capacitor, a resistor and an inductor, wherein the measuring circuit is a series circuit, a parallel circuit or a combination thereof.

3. The high compatibility dimming system as claimed in claim 1, wherein the control circuit is configured to couple a detecting signal to the alternating current source connector in order to detect the measured value of the measuring circuit.

4. The high compatibility dimming system as claimed in claim 1, wherein the lighting device further comprises a filtering circuit, and the rectifying circuit is connected to the constant current circuit via the filtering circuit.

5. The high compatibility dimming system as claimed in claim 4, wherein the lighting device further comprises an assistant power source, and the control circuit is connected to the rectifying circuit via the assistant power source.

6. The high compatibility dimming system as claimed in claim 4, wherein the lighting device further comprises an assistant power source and a leakage detecting circuit, wherein the control circuit is connected to the assistant power source, the assistant power source is connected to the leakage detecting circuit, and the leakage detecting circuit is connected to the rectifying circuit.

7. The high compatibility dimming system as claimed in claim 1, wherein the light source is a light-emitting diode.

8. The high compatibility dimming system as claimed in claim 1, wherein the dimming signal is a pulse width modulation signal.

9. A high compatibility dimming system, comprising:
an alternating current source connector;
a lighting device comprising a rectifying circuit, a constant current circuit, a control circuit and a light source, wherein an input end of the rectifying circuit is connected to an output end of the alternating current source connector, and an output end of the rectifying circuit is connected to the constant current circuit, and the control circuit is connected to the rectifying circuit and the constant current circuit, and the constant current circuit is connected to the light source; and
a wall switch comprising a measuring circuit, wherein an external power source is connected to an input end of the alternating current source connector via the wall switch;
wherein the control circuit is configured to continuously detect a measured value of the measuring circuit and generates a dimming signal according to a number of times of detecting the measured value during a predetermined time period in order to control the constant current circuit to adjust a brightness of the light source, wherein the wall switch further comprises a first switch, a second switch and a full wave rectifier, wherein a first end of the first switch is connected to a first end of the full wave rectifier, a second end of the first switch is connected to a live wire terminal of the alternating current source connector and a first end of the measuring circuit, a first end of the second switch is connected to a second end of the full wave rectifier, a second end of the second switch is connected to a second end of the measuring circuit, and a third end and a fourth end of the full wave rectifier are connected to a live wire terminal and a neutral wire terminal of the external power source respectively.

* * * * *